(12) United States Patent
Booth

(10) Patent No.: US 7,151,678 B2
(45) Date of Patent: Dec. 19, 2006

(54) POWER SYSTEM WITH REDUNDANT POWER SUPPLY APPARATUS

(75) Inventor: James R. Booth, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 61 days.

(21) Appl. No.: 11/013,050

(22) Filed: Dec. 15, 2004

(65) Prior Publication Data
US 2006/0126363 A1    Jun. 15, 2006

(51) Int. Cl.
*H02M 3/335* (2006.01)
(52) U.S. Cl. ....................................................... 363/15
(58) Field of Classification Search ................. 307/64, 307/65, 66; 363/15, 37
See application file for complete search history.

(56) References Cited

U.S. PATENT DOCUMENTS

| | | | | |
|---|---|---|---|---|
| 5,229,650 A | * | 7/1993 | Kita et al. | 307/66 |
| 5,982,652 A | * | 11/1999 | Simonelli et al. | 363/142 |
| 6,122,181 A | * | 9/2000 | Oughton, Jr. | 363/37 |
| 6,630,751 B1 | * | 10/2003 | Curtis et al. | 307/64 |

OTHER PUBLICATIONS

Marty Brown; Practical Switching Power Supply Design, Motorola, Series in Solid State Electronics, 12.4 A60W, Off-Line Flyback converter with Battery Backup, pp. 226-234.

* cited by examiner

*Primary Examiner*—Adolf Berhane
(74) *Attorney, Agent, or Firm*—Valerie M. Davis

(57) ABSTRACT

A power system (100) includes power conversion apparatus (110) coupled to load apparatus (120) having at least one load circuit (122,124). The power conversion apparatus includes: a first input (102) for receiving an AC signal; a second input (104) for receiving a DC signal; and a first number of power supply circuits (112) each including an AC conversion circuit (210, 240, 250) for generating an output signal based on the AC signal; a revert circuit (270) coupled to the AC conversion circuit for generating the output signal based on the DC signal, the revert circuit including a battery charger (274), wherein each of the battery chargers is coupled in common at the second input and is configured with a corresponding predetermined capacity that causes at least a portion of the DC signal to be provided by at least a portion of the battery chargers.

19 Claims, 3 Drawing Sheets

POWER SYSTEM WITH REDUNDANT POWER SUPPLY APPARATUS

FIELD OF THE INVENTION

The present invention relates generally to power systems and more specifically to a power system having power supply apparatus with redundant functionality to compensate for a failure in one or more of a plurality of power supply circuits within the power supply apparatus.

BACKGROUND OF THE INVENTION

Industry standard power systems typically include a plurality of site rectifiers, for redundancy, coupled to an alternating current (AC) signal source. The output of the site rectifiers is coupled to an input of a power conversion apparatus, which includes a plurality of power supply circuits coupled in parallel, wherein each power supply circuit is coupled together at an input and an output. The input of the power supply circuits is coupled to the output of the site rectifiers and also to an output of a direct current (DC) signal source such as a DC battery.

Each of the power supply circuits includes a DC-to-DC converter which is operationally in series with the plurality of AC-to-DC site rectifiers. Moreover, the output of each of the DC-to-DC converters is combined into a single high-current power bus, which is further divided into lower current busses. Load modules, for instance for radio elements, are combined into groups (e.g., radio frequency (RF) power amplifiers, transceivers, site controllers, alarm, etc.), and circuit breakers protect the circuit distribution system of the low current busses from shorts in each load group. There is typically provided a number of power supply circuits in the power conversion apparatus with capacity adequate for the total of the load groups and a redundant power supply circuit to power load modules that are coupled to a failed power supply circuit. The redundant power supply circuit is essentially identical to each of the other power supply circuits but is not dedicated to any particular load group.

There are many shortcomings in the above system. First, the size and cost of the power system is increased due to the necessity to include in the system the redundant power supply circuit, the redundant site rectifiers, a high current power bus (typically made with copper bars), and an array of circuit breakers to protect the bus. In addition, since the system typically has only one redundant power supply circuit, a failure in two of the power supply circuits typically causes the power system to immediately enter into an impaired state, i.e. causes a shut-down of the system or a portion thereof.

Thus, there exists a need for a power system having improved power conversion apparatus. It is desirable that the system provide for redundancy functionality without the need for a redundant power supply circuit, such that the system may continue to operate upon the failure of one or more of the power supply circuits. It is further desirable that the power system operate for an extended period of time in the event of a failure of any one or more of the power supply circuits in the power conversion apparatus. Moreover, it is desirable that the system have a decreased cost and a more compact size as compared to known systems having the same capacity.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
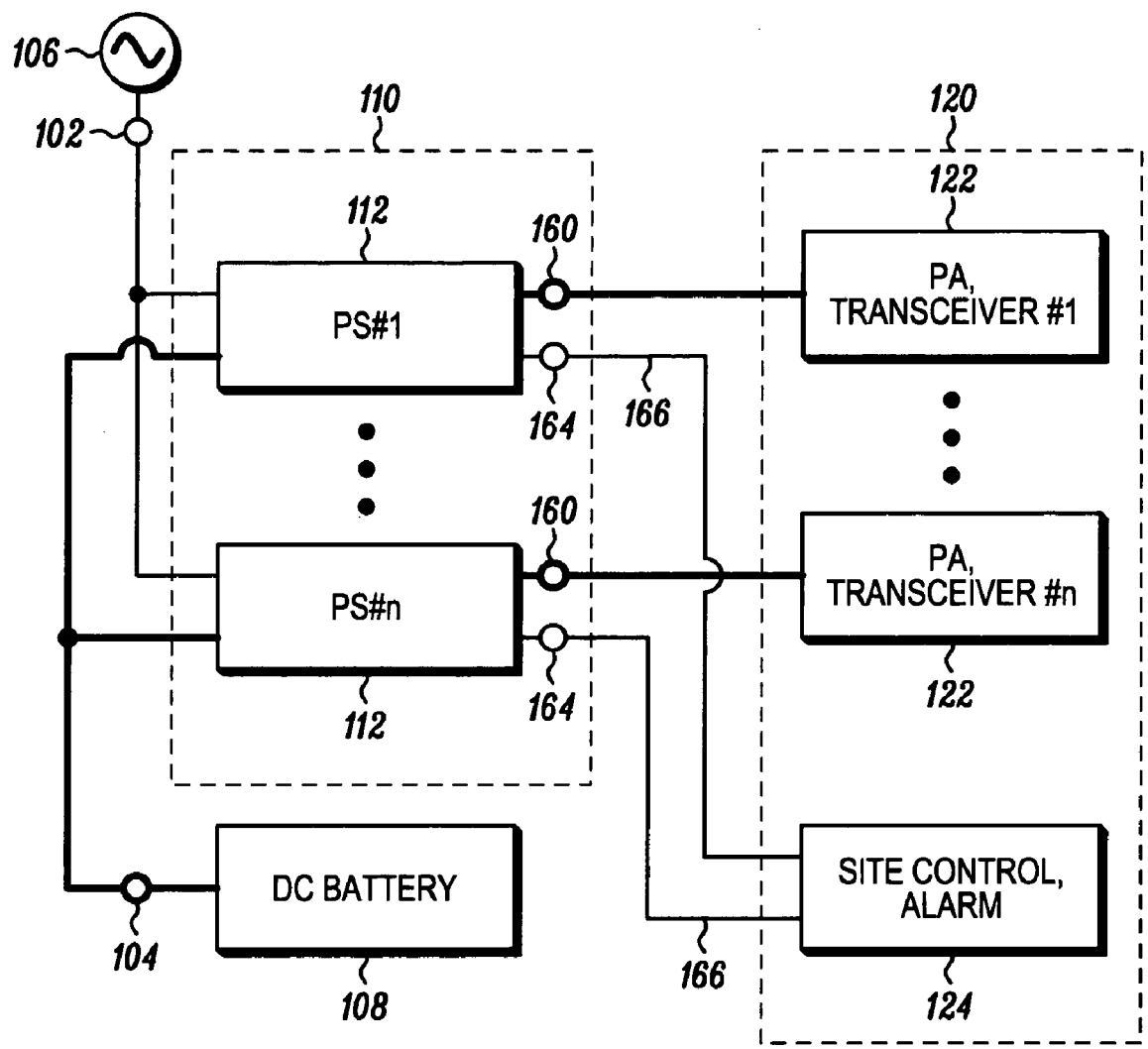
FIG. 1 illustrates a block diagram of a power system in accordance with an embodiment of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements.

FIG. 1 illustrates a block diagram of a power system 100 in accordance with one embodiment of the present invention. Power system 100 comprises power conversion apparatus 110 operatively coupled to load apparatus 120 in accordance with the present invention and as explained in detail below, wherein the term load apparatus is generally referred to herein as apparatus that has a given operating power requirement that may be satisfied by one or more output signals from the power conversion apparatus. The load apparatus in the embodiments of the invention described below, by way of example, comprises conventional radio apparatus (e.g., RF power amplifiers, transceivers, site controllers, alarms, etc.). However, those of ordinary skill in the art will realize that the teachings described herein do not depend on the type of load apparatus used but can be applied to any type of load apparatus. As such, alternative implementations using different types of load apparatus are contemplated and are within the scope of the various teachings described.

Figure 2:
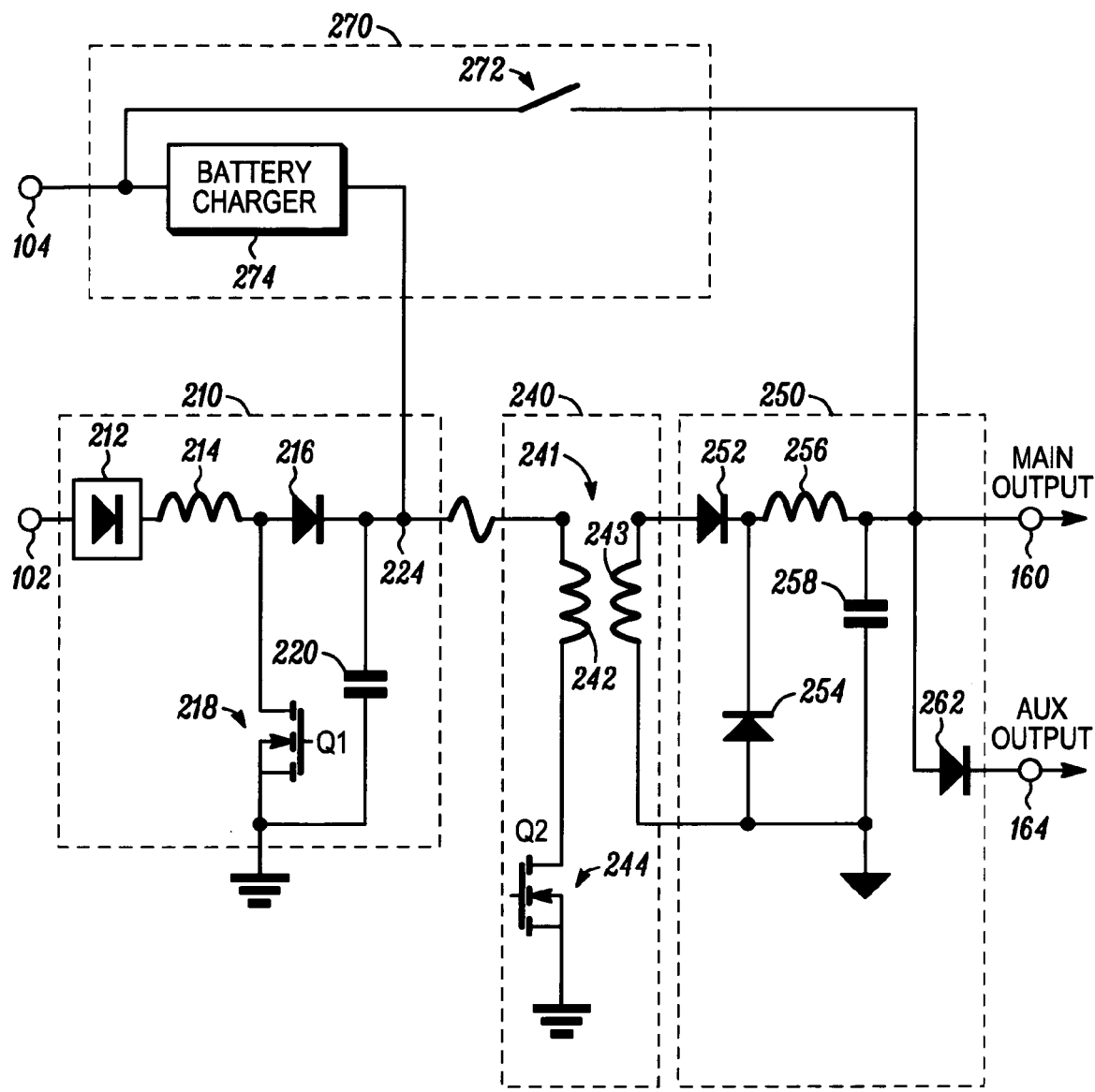
FIG. 2 illustrates a schematic circuit diagram of an embodiment of a power supply circuit that may be used in the power system of FIG. 1.
Figure 3:
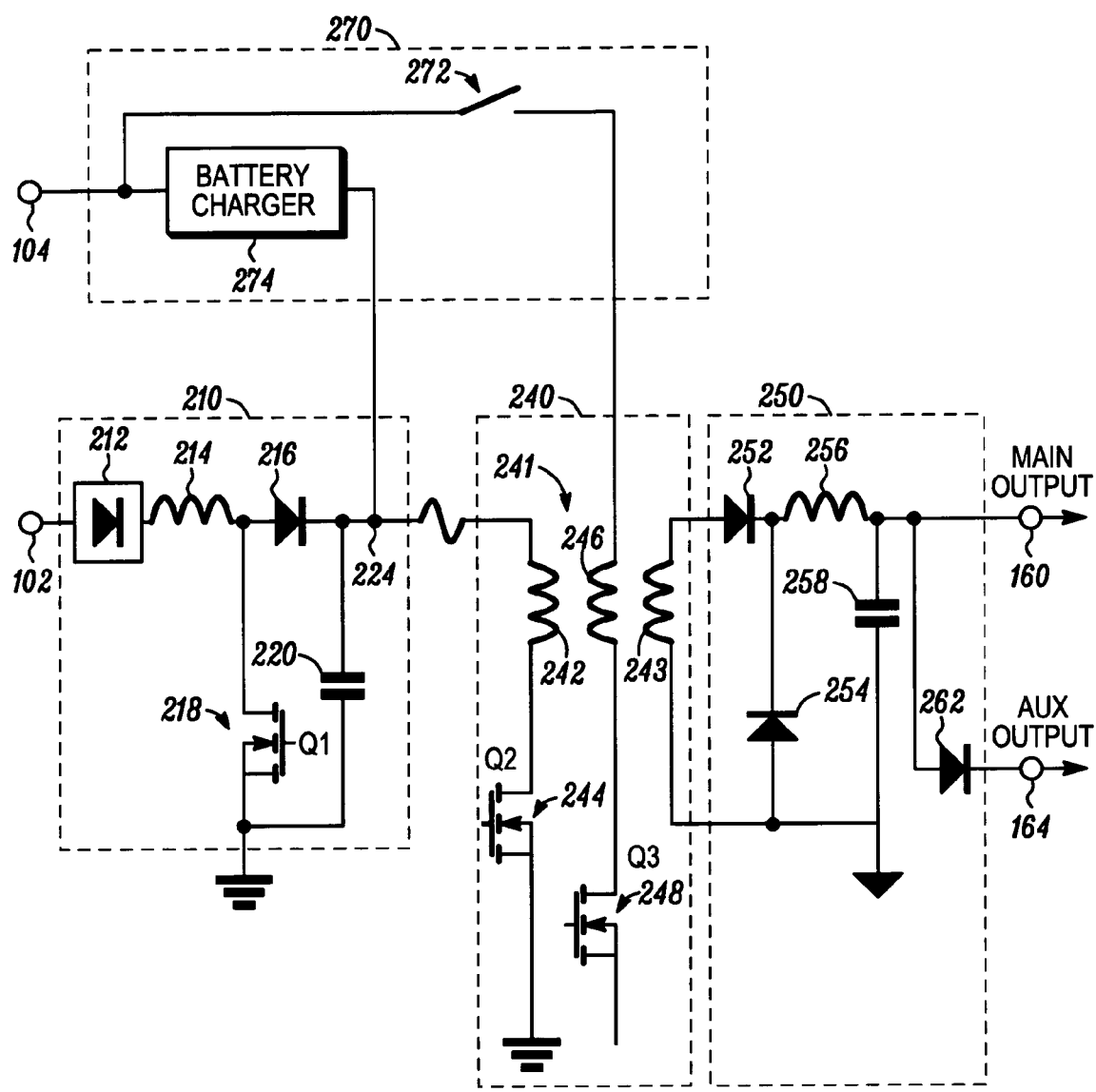
FIG. 3 illustrates a schematic circuit diagram of another embodiment of a power supply circuit that may be used in the power system of FIG. 1.

Turning to the elements of power conversion apparatus 110, it comprises: an input 102 for receiving an alternating current (AC) input signal from an AC signal source 106 coupled thereto such as, for instance a line voltage from a commercial AC mains; an input 104 for receiving a direct current (DC) input signal a portion of which is typically provided by a DC signal source 108 coupled thereto, which in this example is a DC battery, for instance a 24 Volt or a −48 Volt battery; and at least one and ideally a plurality (i.e., at least two) of power supply circuits 112 (illustrated as PS#1-PS#n) operatively coupled to inputs 102 and 104, for example as described below by reference to FIGS. 2 and 3.

Each power supply circuit has at least one primary or main output 160 that may be coupled to load apparatus 120. Each power supply circuit may also optionally have at least one additional or auxiliary output 164 that may be coupled to load apparatus 120 depending upon the particular implementation of the present invention. The terms main output and auxiliary output (and equivalent language) are used throughout in a general manner and are not meant to limit the configuration of the output(s) of the power conversion apparatus of the present invention described herein.

Load apparatus 120 includes radio apparatus, in this embodiment, that is grouped into at least one and ideally a plurality of load circuits 122, 124. Ideally load circuits 122 each have substantially the same operating power requirements, i.e. they are each substantially the same sized load circuit and require substantially the same power output from the power conversion apparatus for operation, taking into consideration any small differences in load size due to process variations and losses inherent in the circuitry.

In one embodiment, each load circuit 122 corresponds to a separate radio device comprising substantially the same power amplifier and transceiver apparatus (illustrated as PA, Transceiver #1-PA, Transceiver #n). Also, ideally the number of load circuits 122 is equal to the number of power supply circuits 112, and each load circuit 122 is coupled to the output 160 of a different power supply circuit 112. Coupling the outputs of the power supply circuits to the load apparatus in this manner, rather than bussing those outputs together, eliminates the need for a high current output bus and output circuit breakers for coupling the power conversion apparatus to the load apparatus and for protection of the power supply circuit outputs. Conversely, each power supply circuit may include suitable electronic current limiting for protection of its output 160. Eliminating the high current output bus and output circuit breakers also enables a cost savings in manufacturing the power system 100.

Furthermore, ideally radio apparatus elements that are needed by each radio 122 (e.g., a site controller, an alarm circuit, etc.) are included in at least one separate load circuit 124. Load circuit 124 is coupled to each load circuit 122 using any suitable means (not shown) and to at least two and preferably all of the power supply circuits 112 using, for example, one or more busses 166. Having multiple busses 166 (two in this illustration) provides for redundancy for load circuit 124. Thus, in the event of a failure of any one or more of the power supply circuits 112, power will continue to be provided to load circuit 124 from at least one of the remaining power supply circuits 112. This redundancy is provided without the need for including an equivalent load circuit 124 in each of the load circuits 122, thereby enabling additional cost savings.

Those of ordinary skill in the art will realize that although it is beneficial to arrange the outputs of the power supply circuits and the elements of the load apparatus as described above, the present invention is also applicable to embodiments having different power supply circuit output and load apparatus configurations. For example, the teachings described herein may be applied to implementations wherein (as is used in the prior art) the outputs of the load circuits are bussed together and coupled to the load apparatus using circuit breakers, without loss of generality.

Turning now to the details of each of the power supply circuits 112, FIG. 2 illustrates a schematic circuit diagram of an embodiment of a power supply circuit 112 that may be used in the power system of FIG. 1. Power supply circuit 112 comprises an AC conversion circuit coupled to input 102 of the power supply apparatus for receiving the AC input signal from AC signal source 106, and based upon this AC signal, generating an output signal that is provided at output 160. Power supply circuit 112 further comprises a revert circuit 270 coupled to input 104 and to the AC conversion circuit for receiving the DC input signal, and based upon this DC signal, generating an output signal that is provided at output 160.

Turning to the specifics of the AC conversion circuit, this exemplary AC conversion circuit generally comprises three elements. Those three elements are: a rectifier circuit 210 operatively coupled to input 102 for converting the AC input signal into a DC signal at a node 224; a power processing circuit 240 operatively coupled to the rectifier circuit 210 for stepping the DC signal at node 224 down to an AC signal that may be used (after rectification and filtering) to operate the load apparatus 120 and for providing isolation between input 102 and outputs 160 and 164; and a rectifier and filter circuit 250 operatively coupled to the power processing circuit 240 for rectifying and smoothing the stepped-down AC signal before it is provided at output 160.

Rectifier circuit 210, as illustrated, comprises a conventional boost circuit, typically used to provide power factor correction of the input AC line current. Accordingly, rectifier circuit 210, in this illustration, includes a rectifying device 212 (in this case a diode), an inductor 214, a diode 216 and a switching transistor Q1 218 configured in accordance with FIG. 2 and that operates in accordance with well known principles, which will not be repeated here for the sake of brevity, to provide a corresponding DC signal at node 224.

Skilled artisans will realize that power processing circuit 240 and rectifying and filtering circuit 250 combined comprises a conventional forward converter. Accordingly, power processing circuit 240, as illustrated, includes a transformer 241, having a primary winding 242 and a secondary winding 243, coupled to a switching transistor Q2 244 coupled in accordance with FIG. 2.

Filtering circuit 250, as illustrated, includes two diodes 252, 254, an inductor 256 and a capacitor 258 operatively coupled together in accordance with FIG. 2. If power supply circuit 112 includes an auxiliary output 164, filtering circuit 250 will typically also include a current limiting device 262 (as illustrated a diode) connected between outputs 160 and 164 for current limiting and protection of the load apparatus from a failure in the power supply apparatus. Those skilled in the art will realize that control circuitry (not shown) may be included to provide for electronic current limiting for protection of outputs 160 and 164 so that a circuit breaker is not necessary between these outputs and the load apparatus 120. Power processing circuit 240 and filtering circuit 250 operate in accordance with well known principles, which will not be repeated here for the sake of brevity, to generate a DC signal at output 160 from the DC signal at node 224, suitable for use by load apparatus 120.

Returning to revert circuit 270, as illustrated it comprises a conventional and suitable battery charger 274 and a switch 272 that may be, for example, one or more FETs. Battery charger 274 is connected to node 224, wherein it receives the DC signal at that node and provides a corresponding DC signal at node 104 that may be used to charge battery 108. Moreover, ideally the battery charger of each power supply circuit is, in accordance with the present invention, configured having a predetermined capacity that causes at least a portion of the DC signal from the battery charger to be used as part of the DC input signal for any one or more of the power supply circuits 112 in the event of a failure in the AC conversion circuit.

Switch 272 is connected between output 160 and input 104 to enable the DC input signal to be coupled to power supply circuit 112 for powering the load apparatus 120 upon a failure of the AC conversion circuit or a failure of the AC signal source. Those of ordinary skill in the art will realize that revert circuit 270 typically includes additional elements not shown such as, for instance, circuitry to detect such failures that would necessitate the power system being powered by the DC input signal and that would accordingly control the closing of switch 272.

The operation of power system 100 can in general be broken into three phases: normal operation; operation with a failed AC signal source; and operation with a failed AC conversion circuit. Following is an illustration of the operation of the embodiment of power system 100 during all three phases with power conversion apparatus comprising a plurality of power supply circuits 112 as illustrated in FIG. 2. Let us assume for purposes of this illustration that there are six load circuits 122 in the load apparatus, wherein each load circuit has a known load requirement. Accordingly, ideally there are also six power supply circuits 112 such that each load circuit 122 is coupled to an output 160 of a different power supply circuit 112. In addition, ideally the battery charger 274 in each of the power supply circuits 112 is configured with a predetermined capacity such that it supports at least one-fifth of the known load requirement for a single load circuit 122.

Based upon the above assumptions, during normal operation the AC conversion circuit for each power supply circuit 112 generates a DC signal at its output 160 from the AC signal source (line voltage) that may be, for instance, substantially 29 Volts, and also generates a DC signal at output 164 that is substantially 29 Volts (that is also slightly decreased by losses in the protection device 262). When there is a failed AC signal source 106, this is detected, for instance by battery revert circuit 270, and switch 272 is closed, and the load apparatus 120 is powered by the DC input signal at input 104. Upon the failure of the AC signal source 106, there is no DC signal at node 224 for powering each battery charger 274, therefore the DC input signal is provided to each of the power supply circuits 112 by battery 108 alone, which is selected to be large enough to support the load apparatus 120 for a predetermined number of hours. Moreover, the battery 108 voltage should be chosen to match the acceptable input voltage operating range of the load apparatus 120. However, this final restriction is not required in the embodiment of the present invention detailed below by reference to FIG. 3.

When there is a failure in the AC conversion circuit in say one of the power supply circuits 112, for example caused by a failure in transistor Q2 244, this is detected, switch 272 is closed, and the load apparatus 120 is powered by the DC input signal at input 104. However, in this case since the AC signal source is still providing an AC input signal at input 102 there is a DC voltage at node 224 in at least the other five power supply circuits (that do not have a failed AC conversion circuit), which is in turn used by the battery chargers 274 of these five circuits to generate a corresponding DC input signal at node 104.

This combined DC signal from the battery chargers is sufficient to satisfy the load requirement of the load circuit 122 that is coupled to the power supply circuit 112 with the failed AC conversion circuit. Accordingly, this combined DC signal from the battery chargers can be used by the power supply circuit with the failed AC conversion circuit to power its load circuit (theoretically indefinitely) without the need to deplete any of the resources from the battery 108.

Thus, redundancy functionality is provided in the power supply apparatus without the need for a redundant power supply circuit.

Where there are two or more power supply circuits with failed AC conversion circuits, a portion of the DC input signal supplied to those power supply circuits will be provided by the battery 108 and a portion will be provided by at least the battery charger of those power supply circuits without a failed AC conversion circuit. Accordingly, the operation life of the power system 100 will be reduced, but to a lesser degree than when the AC signal source itself fails. This is in contrast with the prior art power systems that would typically be non-operational or severely impaired upon a failure of two or more of the power supply circuits, where only a single redundant power supply circuit is provided.

Those of ordinary skill in the art will realize that the battery chargers of the power supply circuits may be configured with predetermined capacities in ratios other than those discussed above to provide for continued operation of the load apparatus in the event of the failure of one or more of the power supply circuits. Those of ordinary skill in the art will further realize that the battery charger input source could, alternatively, be derived directly from the AC signal source 106 rather than from the output of the boost circuit 210 (e.g., at node 224). If the power supply circuit were so designed, the failed power supply circuit's own battery charger could also provide a portion of the DC input signal, further extending the life of the battery.

If power system 100 is implemented with linear power amplifiers, for example, that require a tightly regulated input voltage under all conditions, or if the system for any of a number of reasons required a battery having a voltage that does not match the acceptable voltage operating range of the power supply apparatus, this would create a further requirement of an additional DC-DC regulation stage between battery 108 and the load circuit 122. For example, a typical radio site may use −48 Volt DC batteries, yet the linear power amplifiers may require 29 Volt DC.

FIG. 3 illustrates a schematic circuit diagram of an embodiment of a power supply circuit 112 that may be used when this additional DC-DC regulation stage is required. In accordance with this embodiment, power supply circuit 112 includes all of the elements of the power supply circuit 112 illustrated in FIG. 2. In addition, the power supply circuit 112 of FIG. 3 also includes a DC conversion circuit for converting the DC input signal at input 104 into another DC signal at output 160 that can be used by the load circuit 122.

The DC conversion circuit comprises a conventional forward converter comprising: a power processing circuit that includes a suitable transformer 241, having a primary winding 246 and a secondary winding 243, coupled to a switching transistor Q3 248; and a rectifying and filtering circuit 250 coupled together in accordance with FIG. 3. Skilled artisans will realize that transistor Q3 248 is also typically coupled to a second terminal of battery 108 (not shown). The operation of this power supply circuit 112 in power system 100 is essentially the same as its operation as discussed above by reference to FIG. 2, the difference being that when an output signal from a power supply circuit that has a failed AC conversion circuit is provided at output 160, this output can be more tightly regulated to a predetermined value, e.g., substantially the 29 Volts.

In the implementation of the DC conversion circuit illustrated in FIG. 3, the AC conversion circuit and the DC conversion circuit are coupled in parallel, e.g. share a common output 160. More particularly, they share a common transformer 241 and a common rectifying and filtering circuit 250. This enables cost and space savings in the power system 100 over the prior art power systems. However, those skilled in the art will appreciate that other implementations of a DC conversion circuit are within the scope of the teachings herein.

Turning now to a further explanation of redundancy improvements, a comparison will be made between the present invention and a typical power system implementation as introduced in the BACKGROUND OF THE INVENTION section. The comparison will also include the DC-DC regulation stage to support linear power amplifiers because the prior art system with DC-DC power supply circuits (also referred to herein as power supplies) can also support linear power amplifiers with regulated input voltage requirements.

As an exemplary case, assume a radio system with load apparatus power requirement equal to 4000 Watts, supporting six radio modules. AC-powered Site Rectifiers provide a DC source to the array of DC-DC power supplies that support the load apparatus. Standard industry practice shows that this typical site would be built using three 2000W DC-DC power supplies. Two of them will support the corresponding load apparatus in normal operation, and one is included to provide redundancy in the case of a failure. Note that the three power supplies will typically share the total load at all times and two would take on the full load if one fails. As can be seen this system includes one and one-half times (150%) the load apparatus requirement in DC-DC power conversion capability simply to provide redundancy. If two of the power supplies fail, the power capacity of the system drops to one-half of that required to support the load apparatus. In this case at least half of the system must be shut down. Since the battery source of energy is "upstream" of the failed DC-DC converters, there is no opportunity to use the battery as an alternate source of power.

The corresponding power system built in accordance with the present invention includes six individual power supplies as described earlier. Each power supply will support 667 watts (4000/6). As described previously, the battery chargers would need to provide ⅕ of one load, or ⅕ of ⅙ of the total (i.e. 1/30 of the total load). For this example, each battery charger is sized to provide 133 watts. In total, five of these battery chargers essentially produce the power required when the normal power conversion path (the AC-DC path) fails. As can be easily calculated, this total is 667W or ⅙ of the total load requirement to support redundancy for the normal power conversion path. Stated another way, the system requires 117% of the load requirement in DC-DC power conversion capability for redundancy compared to 150% in the typical system.

As stated above, both of these systems will continue to operate indefinitely when one power supply fails, and half of the prior art system will fail if two power supplies fail. If two power supplies fail in the system built in accordance with the present invention, only four battery chargers will remain to support the load apparatus. In this case, the battery chargers will support 80% of one load circuit, and the battery will need to support 120% of a load circuit. In a system that is designed for typical four hour holdup time when AC mains fails, this system will continue to operate with full functionality for 20 hours. This is a clear and significant improvement over the prior art system. In fact, it is not customary practice to even consider more than one failure in power system availability calculations since it is assumed the system will suffer severe impairment with more than one failure.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. For example, the specifics of the exemplary AC conversion circuits, revert circuits and DC conversion circuits illustrated in FIGS. 2 and 3 are not specifics of the invention itself, and the teachings set forth herein are applicable in a variety of alternative settings. Therefore, since the teachings described do not depend upon the types of AC conversion, revert and DC conversion circuits used, any number of these circuits known in the art or designed based upon principles well known in the art may be used to implement the present invention without loss of generality. Thus, it should be understood that the invention is not limited by the foregoing description, but embraces all such alterations, modifications and variations in accordance with the spirit and scope of the appended claims.

What is claimed is:

1. A power system comprising:
   power conversion apparatus comprising:
      a first input for receiving an alternating current (AC) signal;
      a second input for receiving a direct current (DC) signal;
      a first number of power supply circuits each comprising:
         an AC conversion circuit for generating an output signal based on the AC signal;
         a revert circuit coupled to the AC conversion circuit for generating the output signal based on the DC signal, the revert circuit comprising a switch and a battery charger, wherein the switch and the battery charger of all of the revert circuits are coupled in common at the second input; and
         at least one output for providing the output signal; and
   load apparatus operatively coupled to the power conversion apparatus to receive the output signal and comprising at least one load circuit, wherein each battery charger is configured with a corresponding predetermined capacity that causes at least a portion of the DC signal to be provided by the battery chargers and, thereby, at least a portion of the output signal to be generated using the battery chargers upon failure of at least one AC conversion circuit.

2. The power system of claim 1, wherein the at least one load circuit includes a plurality of load circuits having substantially the same operating power requirements.

3. The power system of claim 2, wherein the first number of power supply circuits is equal to the number of load circuits in the plurality.

4. The power system of claim 2, wherein each of the load circuits in the plurality comprises substantially the same power amplifier and transceiver apparatus.

5. The power system of claim 2, wherein the predetermined capacity of each of the battery chargers is substantially the same and is based on the operating power requirement of at least one of the load circuits in the plurality.

6. The power system of claim 5, wherein there are six battery chargers and six load circuits in the plurality, and wherein the predetermined capacity of each battery charger is at least one-fifth of the operating power requirement of one of the six load circuits in the plurality.

7. The power system of claim 2, wherein each of the load circuits in the plurality is coupled to the at least one output of a different power supply circuit.

8. The power system of claim 1, wherein at least one load circuit is coupled to the at least one output of at least two of the power supply circuits.

9. The power system of claim 8, wherein the at least one load circuit coupled to the at least two power supply circuits includes at least one site controller and at least one alarm circuit.

10. The power system of claim 1, wherein each of the power supply circuits further comprises a DC conversion circuit coupled to the revert and AC conversion circuits for generating a the output signal based on the DC signal.

11. The power system of claim 10, wherein the AC conversion circuit and the DC conversion circuit for each power supply circuit are coupled together at the at least one output.

12. The power system of claim 10, wherein the AC conversion circuit and the DC conversion circuit include a common output rectifier and filter circuit.

13. The power system of claim 12, wherein the AC conversion circuit is a first forward converter, the DC conversion circuit is a second forward converter and the first and second forward converters include a common transformer and the common output rectifier and filter circuit.

14. A power system comprising:
power conversion apparatus comprising:
  a first input for receiving an alternating current (AC) signal;
  a second input for receiving a direct current (DC) signal;
  a first number of power supply circuits each comprising:
    an AC conversion circuit for generating an output signal based on the AC signal;
    a DC conversion circuit for generating the output signal based on the DC signal;
    a revert circuit coupled to the AC and DC conversion circuits, the revert circuit comprising a switch and a battery charger, wherein the switch and the battery charger of all of the revert circuits are coupled in common at the second input; and
  at least one output for providing the output signal; and
load apparatus comprising a plurality of load circuits, wherein a portion of the plurality have substantially the same operating power requirement and each load circuit in the portion is coupled to the at least one output of a different power supply circuit, wherein each battery charger is configured with a predetermined capacity that is based on the operating power requirement of at least one of the load circuits in the portion, which causes at least a portion of the DC signal to be provided by the battery chargers and, thereby, at least a portion of the output signal to be generated using the battery chargers upon failure of at least one AC conversion circuit.

15. The power system of claim 14, wherein the first number of power supply circuits is equal to the number of load circuits in the portion having substantially the same operating power requirement.

16. The power system of claim 14, wherein each of the load circuits in the portion having substantially the same operating power requirement comprises substantially the same power amplifier and transceiver apparatus.

17. The power system of claim 14, wherein at least one load circuit is coupled to the at least one output of at least two of the power supply circuits.

18. The power system of claim 14, wherein the AC and DC conversion circuits include a common output rectifier and filter circuit.

19. The power system of claim 14, wherein the AC conversion circuit is a first forward converter, the DC conversion circuit is a second forward converter and the first and second forward converters include a common transformer and the common output rectifier and filter circuit.

* * * * *